(12) United States Patent
Yoshino

(10) Patent No.: US 9,985,668 B2
(45) Date of Patent: May 29, 2018

(54) RELAY APPARATUS, RELAY SYSTEM, AND RELAY METHOD

(71) Applicant: NEC Corporation, Minato-ku, Tokyo (JP)

(72) Inventor: Yasunori Yoshino, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days. days.

(21) Appl. No.: 15/617,139

(22) Filed: Jun. 8, 2017

(65) Prior Publication Data

US 2017/0373708 A1 Dec. 28, 2017

(30) Foreign Application Priority Data

Jun. 24, 2016 (JP) .................. 2016-125246

(51) Int. Cl.
| | |
|---|---|
| *H04B 7/15* | (2006.01) |
| *H04B 7/14* | (2006.01) |
| *H04B 1/04* | (2006.01) |
| *H04B 7/155* | (2006.01) |
| *H04W 16/26* | (2009.01) |

(52) U.S. Cl.
CPC ....... *H04B 1/0475* (2013.01); *H04B 7/15507* (2013.01); *H04W 16/26* (2013.01); *H04B 2001/0408* (2013.01)

(58) Field of Classification Search
CPC .......... H04B 1/0475; H04B 7/15507; H04B 7/2606; H04B 7/15; H04B 7/155; H04B 2001/0408; H04W 16/26

USPC ... 455/7, 11.1, 13.1, 127.3, 144, 253.2, 311; 370/226, 293, 274, 279, 315, 492, 501
See application file for complete search history.

(56) References Cited

U.S. PATENT DOCUMENTS

| | | | | |
|---|---|---|---|---|
| 5,268,975 | A * | 12/1993 | Yoshitani | B23K 26/067 385/16 |
| 2002/0140872 | A1 * | 10/2002 | Kawai | H03J 1/0083 348/731 |
| 2002/0159436 | A1 * | 10/2002 | Adachi | H04L 25/14 370/350 |
| 2006/0046642 | A1 * | 3/2006 | Bassiri | H04B 7/15535 455/7 |
| 2009/0072901 | A1 * | 3/2009 | Yamanouchi | H03F 1/3223 330/149 |
| 2013/0243006 | A1 * | 9/2013 | Otsuka | H04L 12/4604 370/401 |
| 2016/0212630 | A1 * | 7/2016 | Kim | H04B 7/024 |

FOREIGN PATENT DOCUMENTS

| | | |
|---|---|---|
| JP | H09-246895 A | 9/1997 |
| JP | 2006-514488 A | 4/2006 |

* cited by examiner

*Primary Examiner* — Dominic Rego

(57) ABSTRACT

A relay apparatus comprises:
a distributor configured to separate an input signal that includes a plurality of signals of mutually different frequencies for each of the frequencies and output signals separated for each frequency; and
a combiner configured to combine signals output from the distributor, generate at least two signal groups each consisting of signals of mutually different frequencies, and output at least one signal group of the at least two signal groups.

10 Claims, 8 Drawing Sheets

US 9,985,668 B2

RELAY APPARATUS, RELAY SYSTEM, AND RELAY METHOD

This application is based upon and claims the benefit of priority from Japanese Patent Application No. 2016-125246, filed on Jun. 24, 2016, the disclosure of which is incorporated herein in its entirety by reference.

TECHNICAL FIELD

The present invention relates to a relay apparatus, a relay system, and a relay method and, particularly, to a relay apparatus, a relay system, and a relay method that have a function of relaying signals radiated from a base station in a mobile communication system.

BACKGROUND ART

In underground areas and the like, it is difficult in some cases to secure a good radio wave environment between a wireless base station and a portable terminal. For such cases, there is a known technology that enlarges the coverage area of a mobile communication system by installing a relay apparatus (repeater apparatus) that receives radio waves radiated by a wireless base station and that amplifies signals received and radiates the signals via an antenna connected to a repeater apparatus.

For example, PTL 1 describes a repeater apparatus that amplifies an input high-frequency signal and then sends out the amplified signal as a signal of the same frequency. PTL 2 describes a signal enhancer used to expand the coverage area of a wireless communication system.

When a plurality of repeater apparatuses are installed between a wireless base station and a terminal, there is possibility that the terminal may receive not only radio waves radiated from the repeater apparatuses but also reflected waves from structural bodies and the like in surrounding areas. In other words, when a plurality of coverage areas are formed by repeater apparatuses, influence of radio waves in adjacent coverage areas can in some cases make a complicated radio wave environment. In such a case, a terminal that communicates with the base station via repeater apparatuses suffers interference, so that unstable reception levels of radio waves radiated from the repeater apparatuses may result or path switching may frequently occur between the terminal and a plurality of repeater apparatuses. Consequently, there is possibility that the communication quality of the terminal may decline.

A typical repeater apparatus used to enlarge the coverage area of a mobile communication system directly amplifies and transfers a signal received from a base station or another repeater apparatus. Specifically, when a plurality of repeater apparatuses are installed for one base station, coverage areas newly formed by repeater apparatuses each have radio waves of the same frequencies radiated from the repeater apparatuses. Therefore, when repeater apparatuses are installed in an environment where radio wave interference easily occurs, there arises a problem that communication quality may easily reduce due to interference between radio waves of equal frequencies in adjacent coverage areas newly formed by the repeater apparatuses.

Furthermore, neither PTL 1 nor PTL 2 describes that arrangement of frequencies of cells in coverage areas newly formed by repeater apparatuses is set so that radio wave environments of the coverage areas become more preferable.

CITATION LIST

Patent Literature

[PTL 1]: Japanese Laid-open Patent Publication No. 9-246895
[PTL 2]: Published Japanese Translation of PCT International Publication for Patent Application (Kohyo) No. 2006-514488

SUMMARY

A relay apparatus according to one aspect of the present disclosure comprises a distributor configured to separate an input signal that includes a plurality of signals of mutually different frequencies for each of the frequencies and output signals separated for each frequency, and a combiner configured to combine signals output from the distributor, generate at least two signal groups each consisting of signals of mutually different frequencies, and output at least one signal group of the at least two signal groups.

A relay system according to another aspect of the present disclosure comprises a first relay apparatus configured to output at least one signal group of at least two signal groups each consisting of signals of mutually different frequencies sent by a radio base station, a second relay apparatus cascade-connected to the first relay apparatus separately for each of the signal groups and configured to relay the signal groups, and an antenna connected to one of an output terminal of the first relay apparatus and an output terminal of the second relay apparatus and disposed separately for each of the output terminals so that one of the signal groups that forms a first coverage area formed corresponding to one of the output terminals and another one of the signal groups that forms a second coverage area adjacent to the first coverage area are different from each other.

Steps that a program recorded by a non-transitory program recording medium according to still another aspect of the present disclosure causes a computer to execute a step of separating an input signal that includes a plurality of signals of mutually different frequencies for each of the frequencies and outputting signals separated for each frequency, a step of combining the output signals, a step of generating at least two signal groups each consisting of signals of mutually different frequencies, and a step of outputting at least one signal group of the at least two signal groups.

EXEMPLARY EMBODIMENT

First Exemplary Embodiment

Figure 1:
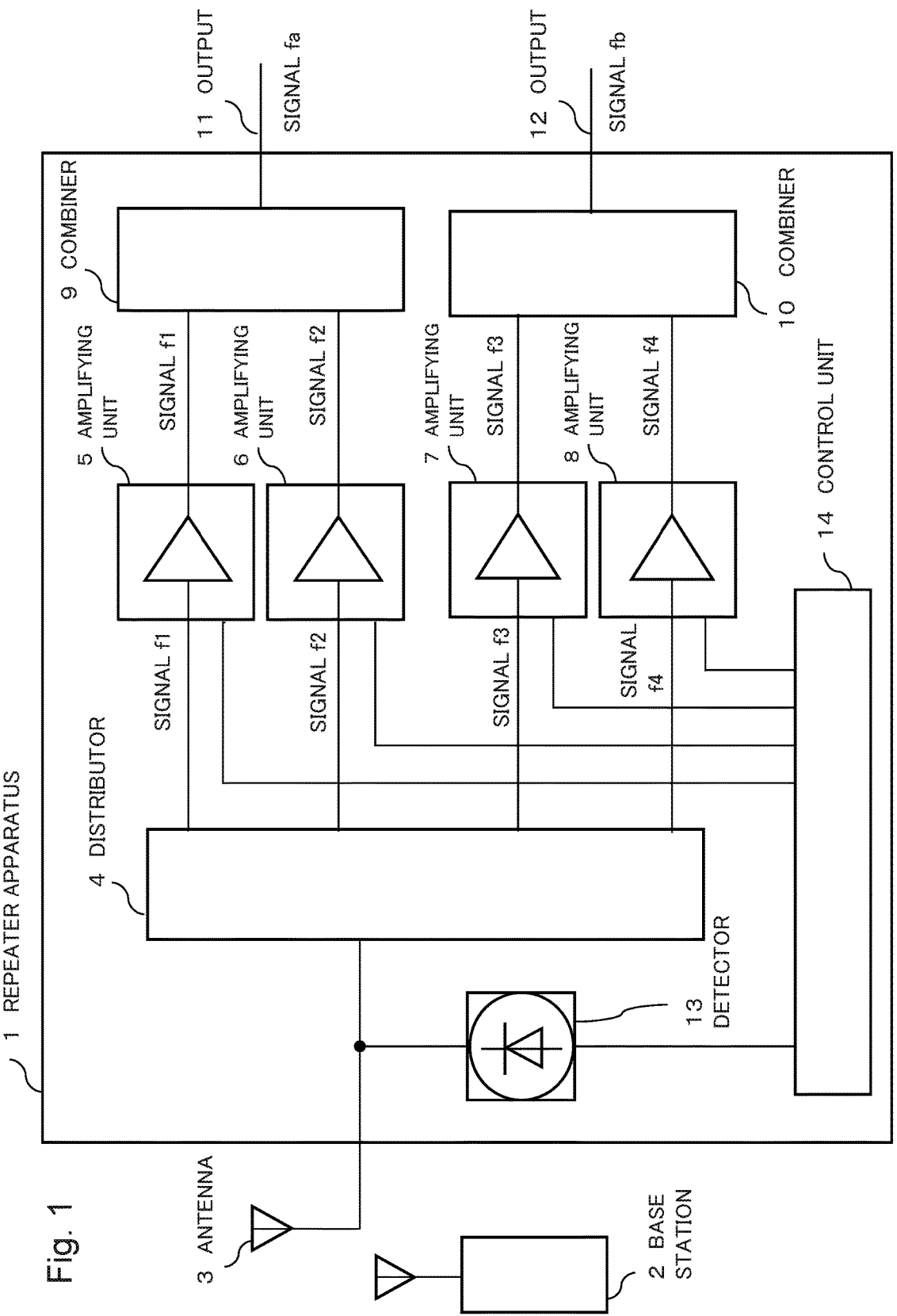
FIG. 1 is a block diagram illustrating a configuration example of a repeater apparatus according to a first exemplary embodiment of the present invention.

FIG. 1 is a block diagram illustrating a configuration example of a repeater apparatus 1 according to a first exemplary embodiment of the present invention. A base station 2 is a wireless base station used in a mobile communication system. The base station 2 radiates radio waves for communication with terminals (not depicted) from an antenna provided in the base station 2. The repeater apparatus 1 has a function of relaying radio waves received from the base station 2. The repeater apparatus 1 communicates with the base station 2 via an antenna 3, processes signals received from the base station 2, and then outputs the signals from output terminals 11 and 12. The output terminals 11 and 12 may be connected to an external appliance by a coaxial cable. The output terminals 11 and 12 can each be connected to at least one of an antenna for communication with terminals and another repeater apparatus or to a transmission appliance such as a distributor, an amplifier, etc. Since a common configuration and functions of the base station 2 are well known, description of the base station 2 will be omitted below.

The repeater apparatus 1 includes a distributor 4, amplifying units 5 to 8, combiners 9 and 10, a detector 13, a control unit 14. In FIG. 1, the antenna 3 is provided outside the repeater apparatus 1. However, the antenna 3 may be contained in the repeater apparatus 1.

The antenna 3 receives radio waves radiated by the base station 2 and inputs the received high-frequency signals (received signals) to the repeater apparatus 1. The received signals input from the antenna 3 are divided to the distributor 4 and the detector 13. The distributor 4 distributes the received signals according to frequencies of the high-frequency signals and outputs the signals to the amplifying units 5 to 8. The amplifying units 5 to 8 amplify the signals distributed from the distributor 4 and output the amplified signals to the combiner 9 or 10. The combiner 9 combines the signals input from the amplifying units 5 and 6 and outputs combined signals from the output terminal 11. The combiner 10 combines the signals input from the amplifying units 7 and 8 and outputs combined signals from the output terminal 12.

Note that although this exemplary embodiment describes an example in which the amplifying units 5 to 8 are configured to amplify signals, the amplifying units 5 to 8 may function as converters configured to convert signals. Specifically, the converters may function as level converters configured to convert levels of signals. The amplifier may be disposed between the distributor and the combiner.

In this exemplary embodiment, a received signal that is received by the antenna 3 can contain four signals whose radio waves received each have carrier wave frequencies (hereinafter, simply referred to as "frequencies") of f1, f2, f3, and f4. The frequencies f1 to f4 are different from one another. In the following description, a signal whose frequency is f1 is termed "signal f1". Likewise, signals whose frequencies are f2 to f4 are termed "signal f2", "signal f3", and "signal f4". Note that it is not necessary that each received signal include all the signals f1 to f4.

The distributor 4 has a filter function, that is, separates received signals input for each of their frequencies and outputs each separated signal to one of the amplifying units 5 to 8. In this exemplary embodiment, the signal f1 is output to the amplifying unit 5, the signal f2 is output to the amplifying unit 6, the signal f3 is output to the amplifying unit 7, and the signal f4 is output to the amplifying unit 8. Hereinafter, a signal group that can include the signal f1 and the signal f2 will be termed "signal fa" and a signal group that can include the signal f3 and the signal f4 will be termed "signal fb". Specifically, the combiner 9 combines the signal f1 and the signal f2 into the signal fa and outputs the signal fa from the output terminal 11. The combiner 10 combines the signal f3 and the signal f4 into the signal fb and outputs the signal fb from the output terminal 12.

Thus, the repeater apparatus 1 has a configuration in which the signals f1 to f4 received from a base station are separated into two or more frequency band groups (the signal fa and the signal fb) and the separated signal groups are output. Then, connecting antennas for communication with terminals to both the output terminal 11 and the output terminal 12 will form coverage areas subject to less interference which is based on the signal groups that include signals whose frequencies are different from each other.

The detector 13 detects levels (electric powers) of received signals separately for each of the frequencies and outputs the results of the detection to the control unit 14. Specifically, the detector 13 detects the levels of the signal f1, the signal f2, the signal f3, and the signal f4 prior to input of these signals to the distributor 4 and outputs signals indicating the detected levels to the control unit 14. The detector 13 includes, for example, a detector diode and an amplifier that amplifies a signal detected by the detector diode. The control unit 14 controls the amplifying units 5 to 8 on the basis of the levels notified by the detector 13.

Figure 2:
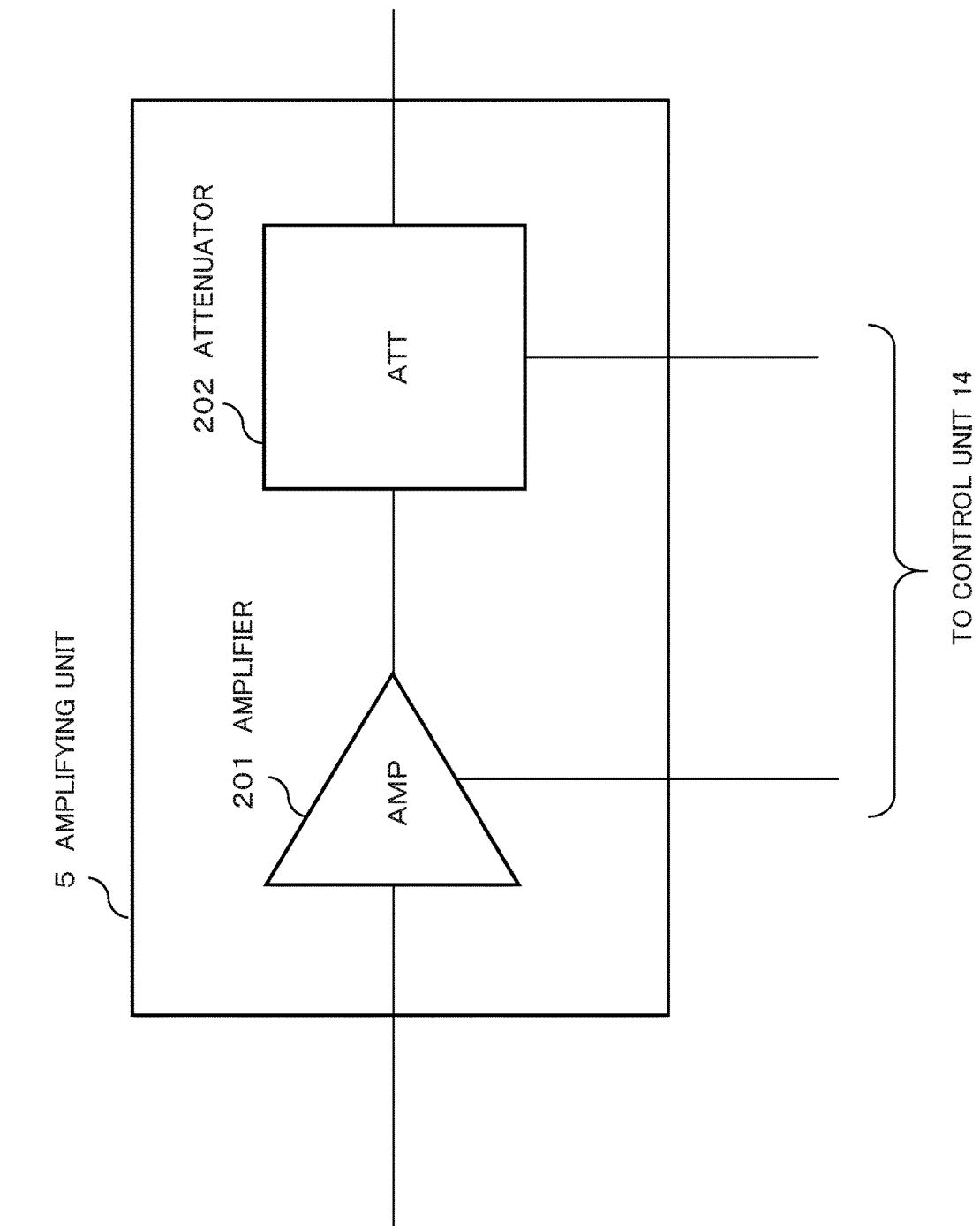
FIG. 2 is a block diagram illustrating a configuration example of an amplifying unit.

FIG. 2 is a block diagram illustrating a configuration example of the amplifying unit 5. The amplifying units 5 to 8 included in the repeater apparatus 1 are all configured in the same manner. Therefore, the following description applies to the amplifying units 6 to 8 as well. The amplifying unit 5 includes an amplifier (AMP) 201 and an attenuator (ATT) 202. The amplifier 201 is an amplifier of electrical signals that amplifies an input signal (i.e., the signal f1 in the amplifying unit 5). The attenuator 202 is a variable attenuator used to adjust the output level of the amplifying unit 5 to a predetermined value. The amplifier 201 and the attenuator 202 are both connected to the control unit 14 and controlled by control signals that the control unit 14 outputs. As for the amplifier 201, the on and off states of the amplifying function are controlled by the control unit 14. In this exemplary embodiment, the amplifying function is turned on and off by turning on and off the supply of electric power to the amplifier 201. However, it is also permissible that switches that open and close the lines of the signals f1 to f4 separately for each of the lines be provided at a pre or post-amplifier-201 stage and therefore the turning on and off of the amplifying functions for the signals be controlled by turning on and off the switches.

The attenuator 202 is controlled by the control unit 14 in terms of amount of attenuation. The control unit 14 is able to control the level of the signal output from each one of the amplifying units 5 to 8 by controlling the attenuator 202.

Figure 3:
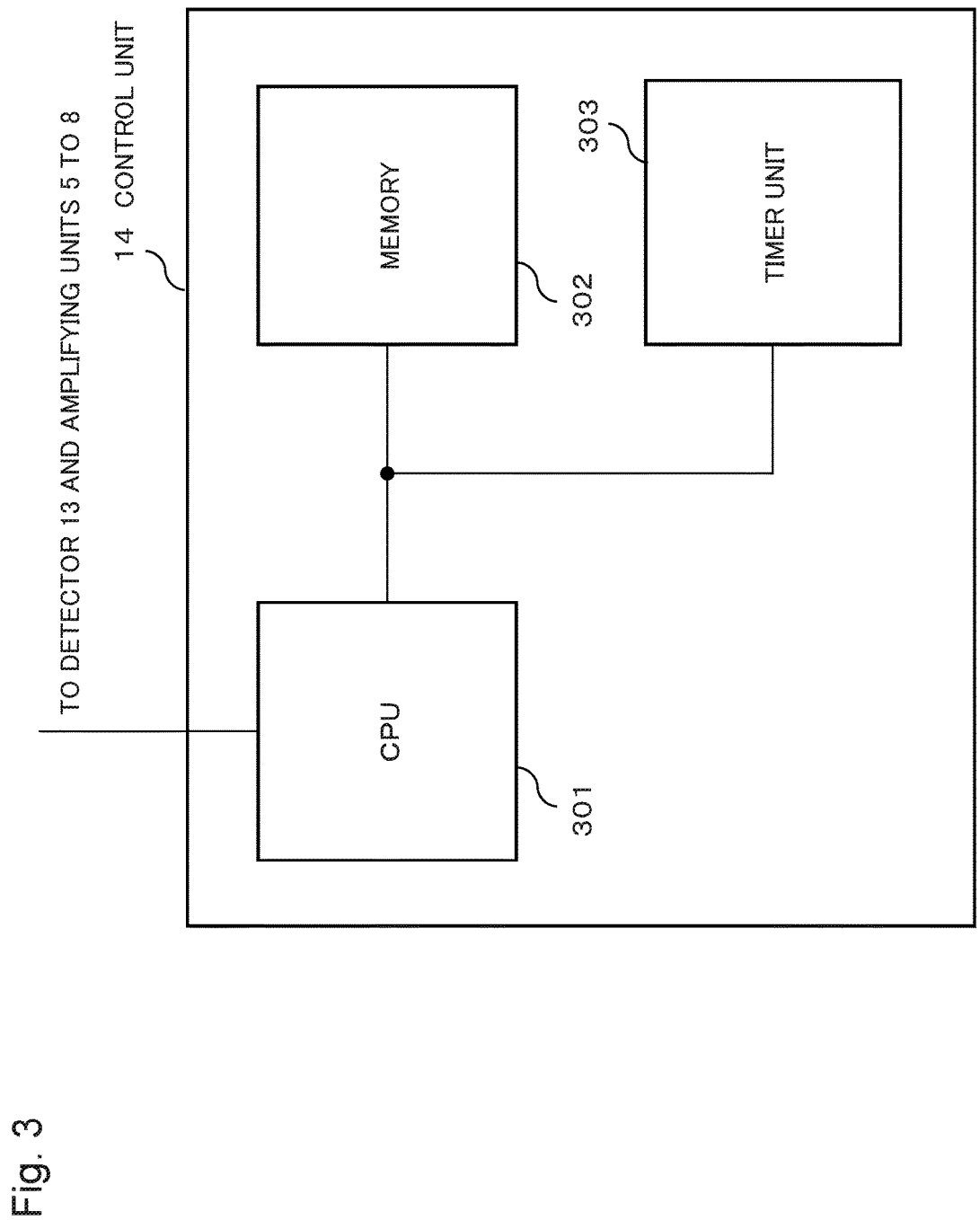
FIG. 3 is a block diagram illustrating a configuration example of a control unit.

FIG. 3 is a block diagram illustrating a configuration example of the control unit 14. The control unit 14 includes a central processing unit (CPU) 301, a memory 302, and a timer unit 303. The CPU 301 performs computations for monitoring and controlling the state of the repeater apparatus 1. The memory 302 records programs that are used by the CPU 301 and setting data such as a reception level-determining threshold value. The memory 302 is a fixed non-transitory recording medium and may be, for example, but not limited to, a semiconductor non-volatile memory. The timer unit 303 includes a clock source for operating the control unit 14 and also includes a timer for counting time which is necessary to realize the functions of the control unit 14.

Signals indicating the levels for each of the frequencies which the detector 13 detects are input to the control unit 14. Based on the signals input from the detector 13, the CPU 301 correspondingly calculates the levels of the signals f1 to f4 to be input to the distributor 4. Furthermore, the control unit 14 is able to adjust the gain or output level of each of the amplifying units 5 to 8 by controlling the amount of attenuation by the attenuator 202 included in a corresponding one of the amplifying units 5 to 8. Further, the control unit 14 is able to control the starting and stopping of amplification of the amplifier 201 by, for example, turning on and off the electric power supply of the amplifier 201. Note that in FIG. 3, connections to the detector 13 and the amplifying units 5 to 8 are simply indicated by a line.

(Description of Operations of First Exemplary Embodiment)

Figure 4:
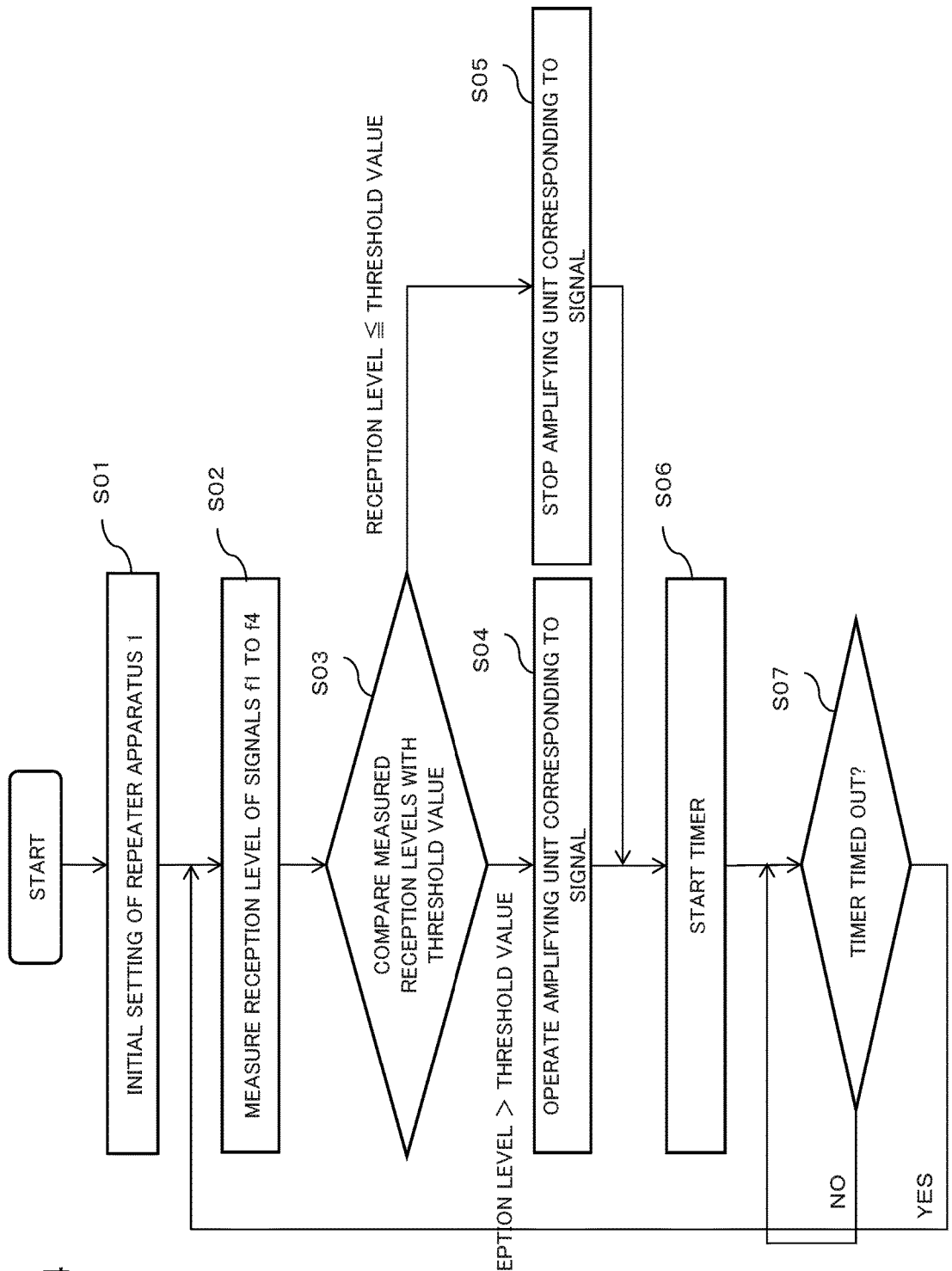
FIG. 4 is a flowchart illustrating an example of an operation procedure of the repeater apparatus.

FIG. 4 is a flowchart illustrating an example of an operation procedure of the repeater apparatus 1 illustrated in FIG. 1. When the repeater apparatus 1 is activated, the control unit 14 performs initial setting of the repeater apparatus 1 (step S01 in FIG. 4). During the initial setting, a threshold value for operating and stopping the amplifying units 5 to 8 in steps S03 to S05 is read from the memory 302. Values used in the initial setting, such as the threshold value, may be written in the memory 302 prior to step S01 by an operator or may be written in the memory 302 when the repeater apparatus 1 is manufactured.

The detector 13 measures the reception levels of the signals f1 to f4 and outputs the reception levels to the control unit 14 (step S02). Operations of the detector 13 may be controlled by the control unit 14.

The control unit 14 compares each of the reception levels of the signals f1 to f4 detected in step S02 with the threshold value read from the memory 302 in step S01 (step S03). When the reception level of a signal exceeds the threshold value, the control unit 14 causes, among the amplifying units 5 to 8, the amplifying unit that receives the signal whose reception level exceeds the threshold value to operate (step S04). When the reception level of a signal is less than or equal to the threshold value, the control unit 14 stops operation of the amplifier that receives the signal (step S05). For example, when the reception level of the signal f1 exceeds the threshold value, the control unit 14 turns on the electric power supply of the amplifier 201 of the amplifying unit 5, and when the reception level of the signal f1 is less than or equal to the threshold value, the control unit 14 turns off the electric power supply of the amplifier 201 of the amplifying unit 5.

After that, the control unit 14 starts the timer of the timer unit 303 (step S06). When the timer times out, the operation flow returns to step S02 (YES in step S07), the measurement of the reception levels and the setting of operation of the amplifying units are repeated. The time for the timer to time out prescribes measurement intervals for the reception levels.

Due to the operations described above, only signals of the frequencies whose reception levels exceed the threshold value are amplified and any one of the amplifiers is stopped from operating when that amplifier is about to receive a signal of the frequency whose reception level is less than or equal to the threshold value. For example, when the reception level of the signal f1 from the antenna 3 is low, the control unit 14 stops operation of the amplifying unit 5. As a result, lower electric power consumption of the repeater apparatus 1 can be achieved. Furthermore, since the stopping of unnecessary operation of the amplifying unit 5 reduces noise radiated from the amplifying unit 5, quality deterioration of the communication carried out by the signals of the other frequencies can be restrained.

(Advantageous Effects of First Exemplary Embodiment)

The repeater apparatus 1 of this exemplary embodiment, as described above, is a relay apparatus that amplifies input high-frequency signals (the signals f1 to f4) and then sends out the amplified signals from the output terminals 11 and 12. The repeater apparatus 1 distributes the input signals separately for each of the frequency bands by using the distributor 4, and amplifies the signals of the frequency bands by using the amplifying units 5 to 8. Then, the repeater apparatus 1 can combine the amplified signals f1 to f4 by using the combiners 9 and 10 and output the combined signals to the outside as two or more signal groups (the signals fa and fb) in which the included signals have frequencies different from each other.

The repeater apparatus 1 of the first exemplary embodiment is able to form a coverage area subject to less interference. A reason for this is that since the repeater apparatus 1 is configured to divide signals received from a base station into two or more frequency band groups and then output the divided signals, the repeater apparatus 1 can be applied to a relay system so that the frequencies in adjacent coverage areas can be arranged so as to reduce interference.

Note that advantageous effects of the repeater apparatus 1 can be achieved by a relay apparatus that merely includes a distributor 4 and combiners 9 and 10. Specifically, the distributor 4 separates input signals (e.g., the signals f1 to f4) that contain two or more signals whose frequencies are different from each other according to the frequencies and then outputs the separated signals to the combiners 9 and 10. The combiners 9 and 10 combine the signals input from the distributor 4 to generate at least one signal group (e.g., the signals fa and fb) in which the included signals have frequencies different from each other and then outputs the at least one signal group. The relay apparatus configured as described above can form a coverage area subject to less interference because the relay apparatus can separate a signal received from a base station into a plurality of signal groups and output the separated signal groups.

Second Exemplary Embodiment

Using the repeater apparatus 1 of the first exemplary embodiment, a coverage area can be formed so that the signal groups (i.e., the signal fa and the signal fb) have specific dispositions by installing an antenna so that the signal groups are radiated into different spaces. Furthermore, repeater apparatuses 1 can be cascade-connected. In a second exemplary embodiment, a relay system that has such a configuration and therefore is capable of forming a coverage area subject to less interference will be described.

Figure 5:
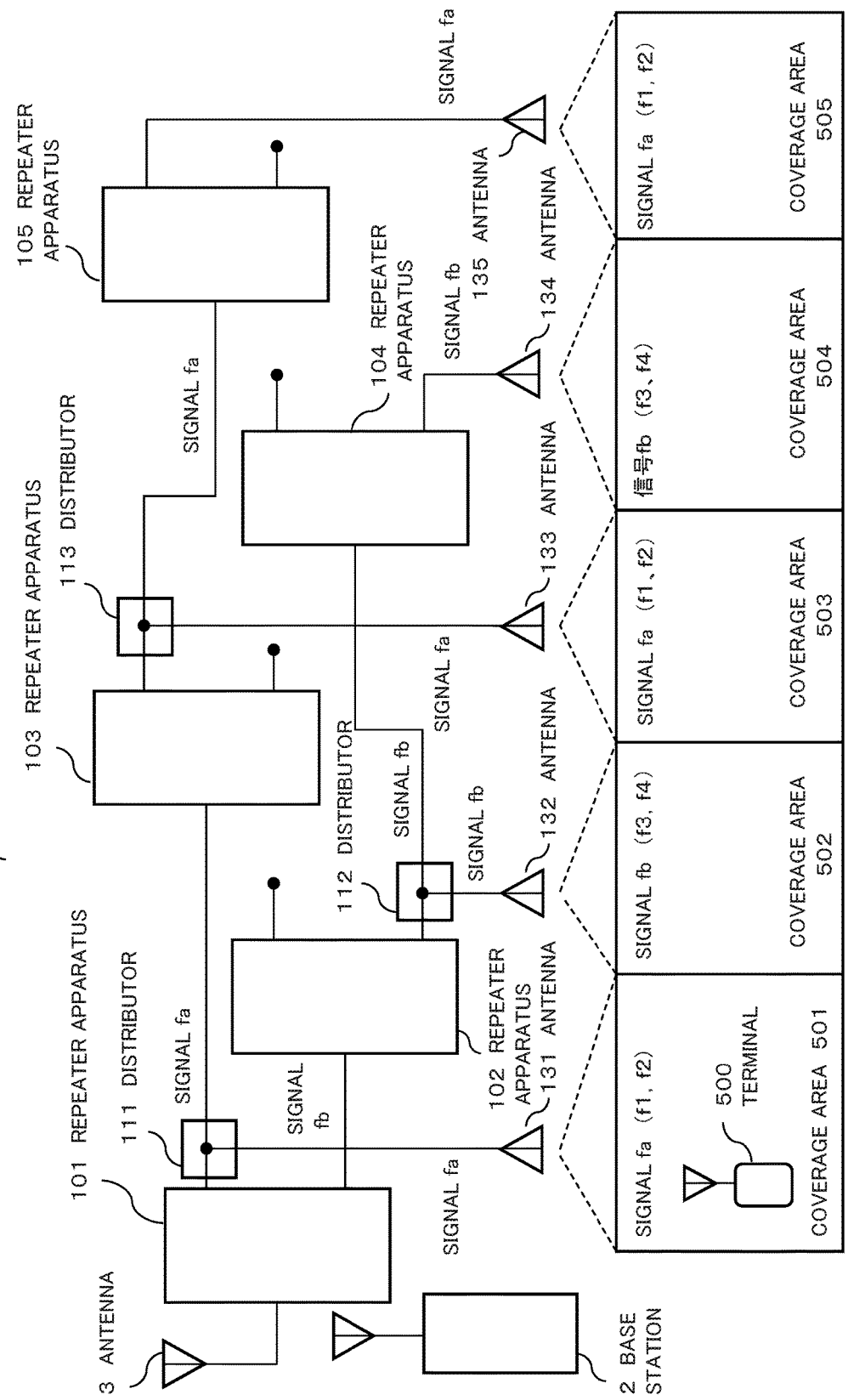
FIG. 5 is a diagram illustrating a configuration example of a relay system according to a second exemplary embodiment.

A relay system that employs a repeater apparatus 1 as described above in the first exemplary embodiment will be described. FIG. 5 is a diagram illustrating a configuration example of a relay system 20 of the second exemplary embodiment of the present invention. The relay system 20 includes repeater apparatuses 101 to 105, distributors 111 to 113, an antenna 3, and antennas 131 to 135. The repeater apparatuses 101 to 105 have substantially the same configuration as the repeater apparatus 1 of the first exemplary embodiment described above. Specifically, the repeater apparatuses 101 to 105 each output a signal fa or a signal fb or both the signals fa and fb according to input signals f1 to f4 that are high-frequency signals. When all the repeater apparatuses 101 to 105 are the same (as the repeater apparatus 1), appliances used in the relay system 20 are commonized, so that costs of construction and maintenance of the system can be reduced.

A base station 2 and a terminal 500 are a wireless base station and a mobile terminal, respectively, that are used in a mobile communication system. The terminal 500 is at a location where the terminal 500 cannot directly receive radio waves from the base station 2. The relay system 20 forms new coverage areas 501 to 505 by relaying radio waves radiated from the base station 2. Inside the coverage areas 501 to 505, the terminal 500 can receive signals contained in radio waves radiated from the base station 2. The base station 2 and the terminal 500 may be included in the relay system 20. Typical configurations and functions of the base station 2 and the terminal 500 are well known and therefore will not be described below.

The repeater apparatuses 101, 103 and 105 are cascade-connected and the repeater apparatuses 101, 102 and 104 are also cascade-connected. The distributors 111 to 113 distribute signals from the repeater apparatuses 101 to 103 to the antennas 131 to 133 and to the next repeater apparatuses 103 to 105, respectively. The antennas 131 to 135 radiate the signals input from the repeater apparatuses 101 to 105, respectively. The antennas 131 to 135 form the coverage areas 501 to 505, respectively, in which the terminal 500 can receive signals from the base station 2.

The antenna 3 is connected to the repeater apparatus 101. The antenna 3 receives from the base station 2 radio waves for communication with the terminal 500 and generates received signals. The received signals received by the antenna 3 are input to the repeater apparatus 101. The received signals include the signals f1 to f4. The repeater apparatus 101, as illustrated in FIG. 1, amplifies the received signals separately for each of the frequencies and outputs the signals fa and fb. The signal fa is bifurcated by the distributor 111 and one of the bifurcated signals fa is sent to the antenna 131. The antenna 131 radiates the signal fa as radio waves. In other words, the antenna 131 radiates the signal f1 and the signal f2.

The other one of the signals fa bifurcated by the distributor 111 is sent to an input of the repeater apparatus 103. Because only the signal fa is input to the repeater apparatus 103, the repeater apparatus 103 relays and outputs only the signal fa to the distributor 113. One of the signals fa bifurcated by the distributor 113 is sent to the antenna 133 and the other is sent to an input of the repeater apparatus 105. The antenna 133 radiates the signal fa as radio waves. The repeater apparatus 105 operates in substantially the same manner as the repeater apparatus 103 and relays and outputs only the signal fa to the antenna 135. The antenna 135 radiates the signal fa as radio waves.

The repeater apparatuses 102 and 104 operate with regard to the signal fb in substantially the same manner as the repeater apparatuses 103 and 105. Specifically, the signal fb is input to the repeater apparatus 102 from the repeater apparatus 101. Because only the signal fb is input to the repeater apparatus 102, the repeater apparatus 102 relays and outputs only the signal fb to the distributor 112. One of the signals fb bifurcated by the distributor 112 is sent to the antenna 132 and the other is sent to an input of the repeater apparatus 104. The antenna 132 radiates the signal fb as radio waves. The repeater apparatus 104 relays and outputs only the signal fb to the antenna 134. The antenna 134 radiates the signal fb as radio waves.

The antennas 131 to 135 radiate the input signal fa or fb to form cells of the mobile communication system. The coverage areas of the cells are conceptually illustrated as the coverage areas 501 to 505 in FIG. 5. As illustrated in FIG. 5, the antennas 131, 133 and 135 that radiate the signal fa and the antennas 132 and 134 that radiate the signal fb are alternately arranged. Since the frequencies of the signals f1 to f4 are different from each other, the coverage areas 501 to 505 are formed so that adjacent cells do not have in common the frequency of any one of the signals. The terminal 500, when in any one of the coverage areas 501 to 505, receives signals from the base station 2 through the use of the signal fa or the signal fb. In FIG. 5, the terminal 500, when in the coverage area 501, 503 or 505, receives signals from the base station 2 by using either the signal f1 or the signal f2 contained in the signal fa. When in the coverage area 502 or 504, the terminal 500 receives signals from the base station 2 by using either the signal f3 or the signal f4 contained in the signal fb.

When the repeater apparatuses 101 to 105 do not receive one of the signals f1 to f4, the detectors 13 as illustrated in FIG. 1 detect that the signal is at a low level. Since, in each repeater apparatus 101 to 105, the amplifying unit corresponding to a signal that is not input does not operate, the repeater apparatuses 101 to 105 output only the signals of frequencies whose input levels are higher than or equal to a threshold value.

In the relay system 20, it is preferable that the levels of output of the repeater apparatuses 101 to 105 be set within such a range that oscillation due to, for example, diffraction between the antenna 3 connected to the base station 2 and the antennas 131 to 135 connected to the terminal 500, does not occur. The output levels of the repeater apparatuses 101 to 105 can be set by the control units 14 controlling the amounts of attenuation caused by the attenuators 202 included in the repeater apparatuses 101 to 105. A procedure of setting the level for avoiding such oscillation is widely known and therefore will not be described in detail.

(Advantageous Effects of Second Exemplary Embodiment)

In the relay system 20 of the second exemplary embodiment, signals from the base station 2 are separated into signal groups (the signal fa and the signal fb) of specific frequencies by the repeater apparatus 101. The repeater apparatuses 102 to 105 amplify the signals of the input signal groups. Then, the antennas 131 to 135 connected to output terminals of the repeater apparatuses 101 to 105 are disposed so that the signal groups radiated in adjacent coverage areas are different from each other. As a result, interference between radio waves in the same frequency band is reduced in adjacent coverage areas and thus a stable communication environment is provided for the terminal 500.

Furthermore, in this exemplary embodiment, the disposition of the frequencies of individual coverage areas is determined in a semi-fixed manner by specifications of the repeater apparatuses, so that interference between coverage areas can be restrained by adopting a simple configuration as compared with a configuration in which the disposition of frequencies of individual coverage areas is dynamically controlled.

Thus, the relay system of the second exemplary embodiment can form a coverage area that is less subject to interference because frequencies of cells in an enlarged coverage area are more suitably disposed.

Third Exemplary Embodiment

In the first and second exemplary embodiments described above, the frequencies of the signals received from the base station 2 are f1 to f4, and these signals are divided into the two signal groups that are the signal fa and the signal fb. However, the number of frequencies and the number of divided signal groups are not limited to the aforementioned numbers. In a third exemplary embodiment, signals having frequencies of f1 to f6 are distributed to three signal groups that are a signal fa, a signal fb, and a signal fc. The frequencies f1 to f6 are different from one another.

Figure 6:
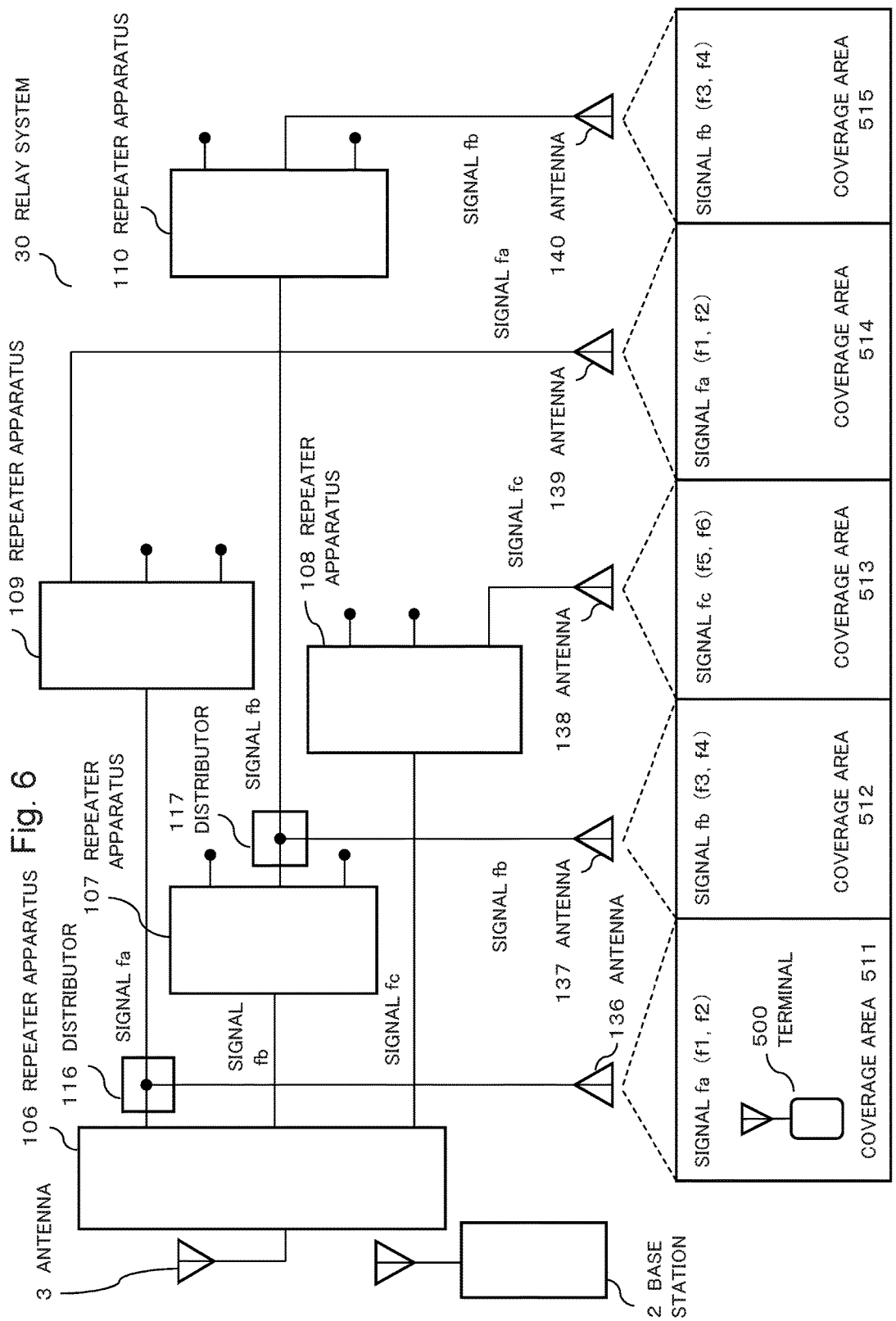
FIG. 6 is a diagram illustrating a configuration example of a relay system according to a third exemplary embodiment.

FIG. 6 is a diagram illustrating a configuration example of a relay system 30 of a third exemplary embodiment of the present invention. The relay system 30 includes repeater apparatuses 106 to 110, distributors 116 and 117, and antennas 136 to 140. The repeater apparatuses 106 to 110 are further different from the repeater apparatus 1 described in the first exemplary embodiment in that the repeater apparatuses 106 to 110 have a function of outputting the signal f5 and/or the signal f6 as a signal fc if either the signal f5 or the signal f6 is input. When the signal f5 and/or the signal f6 is input to the repeater apparatuses 106 to 110, the signal fc is generated and output in substantially the same procedure as the procedure in which the signal fa or the signal fb is generated from the signal f1 and/or the signal f2 or the signal f3 and/or the signal f4, respectively, and then is output. In other words, the repeater apparatuses 106 to 110 each have a function of, when the signals f1 to f6 are input, outputting the signals f1 and f2 as the signal fa, outputting the signals f3 and f4 as the signal fb, and outputting the signals f5 and f6 as the signal fc.

The repeater apparatuses 106 and 109 are cascade-connected and the repeater apparatuses 106, 107 and 110 are also cascade-connected. Furthermore, the repeater apparatus 108 is also cascade-connected to the repeater apparatus 106. The distributors 116 and 117 distribute outputs of the repeater apparatuses 106 and 107 to the antennas 136 and 137 and to the next repeater apparatuses 109 and 110. The antennas 136 to 140 are antennas that allow the repeater apparatuses 106 to 110, respectively, to communicate with the terminal 500. The antennas 136 to 140 form coverage areas 511 to 515, respectively, where communication with the terminal 500 is possible.

The base station 2 and the terminal 500 illustrated in FIG. 6 are a wireless base station and a mobile terminal, respectively, that are used in a mobile communication system, as in FIG. 5. The terminal 500, when in the new coverage areas 511 to 515 formed by the relay system 30, can receive signals contained in radio waves radiated from the base station 2. The base station 2 and the terminal 500 may be included in the relay system 30.

An antenna 3 is connected to the repeater apparatus 106. The antenna 3 receives from the base station 2 radio waves for communication with the terminal 500. Received signals received by the antenna 3, including the signals f1 to f6, are input to the repeater apparatus 106. The repeater apparatus 106 outputs the signal fa, the signal fb, and the signal fc. The signal fa is bifurcated by the distributor 116 and one of the bifurcated signals fa is sent to the antenna 136. The antenna 136 radiates the signal fa as radio waves. In other words, the antenna 136 radiates the signal f1 and the signal f2.

The other one of the signals fa bifurcated by the distributor 116 is sent to an input of the repeater apparatus 109.

Because only the signal fa (i.e., the signal f1 and the signal f2) is input to the repeater apparatus 109, the repeater apparatus 109 relays and outputs only the signal fa to the antenna 139. The antenna 139 radiates the signal fa as radio waves.

The repeater apparatus 107 performs substantially the same operation with regard to the signal fb as the repeater apparatus 109. Specifically, the signal fb is input to the repeater apparatus 107 from the repeater apparatus 106. Because only the signal fb (i.e., the signal f3 and the signal f4) is input to the repeater apparatus 107, the repeater apparatus 107 relays and outputs only the signal fb to the distributor 117. One of the signals fb bifurcated by the distributor 117 is sent to the antenna 137 and the other one of the signals fb bifurcated by the distributor 117 is sent to the repeater apparatus 110. The antenna 137 radiates the signal fb as radio waves. The repeater apparatus 110 relays and outputs only the signal fb to the antenna 140. The antenna 140 radiates the signal fb as radio waves.

The repeater apparatus 108 performs substantially the same operation with regard to the signal fc as the repeater apparatus 109. Specifically, the signal fc is input to the repeater apparatus 108 from the repeater apparatus 106. Because only the signal fc (i.e., the signal f5 and the signal f6) is input to the repeater apparatus 108, the repeater apparatus 108 relays and outputs only the signal fc to the antenna 138. The antenna 138 radiates the signal fc as radio waves.

The antennas 136 to 140 each radiate one of the input signals fa, fb and fc to form cells of the mobile communication system. The coverage areas of the cells are conceptually illustrated as the coverage areas 511 to 515 in FIG. 6. As illustrated in FIG. 6, the antennas 136 and 139 that radiate the signal fa, the antennas 137 and 140 that radiate the signal fb, and the antenna 138 that radiates the signal fc are arranged by turns. Since the frequencies of the signals f1 to f6 are different from each other, the coverage areas 511 to 515 are formed so that adjacent coverage areas do not have in common the frequency of any one of the signals. The terminal 500, when in each one of the coverage areas 511 to 515, receives signals from the base station 2 through the use of the signal fa, fb or fc. In FIG. 6, the terminal 500, when in the coverage area 511 or 514, receives signals from the base station 2 by using either the signal f1 or the signal f2 that are contained in the signal fa. When in the coverage area 512 or 515, the terminal 500 receives signals from the base station 2 by using either the signal f3 or the signal f4 contained in the signal fb. When in the coverage area 513, the terminal 500 receives signals from the base station 2 by using either the signal f5 or the signal f6 contained in the signal fc.

(Advantageous Effects of Third Exemplary Embodiment)

The relay system 30 of the third exemplary embodiment having the foregoing configuration can also form a coverage area subject to less interference, similarly to the relay system 20 of the second exemplary embodiment. Specifically, in the relay system 30 of the third exemplary embodiment, signals from the base station are separated into the signal groups (the signal fa, the signal fb, and the signal fc) of specific frequencies by the repeater apparatus 106. The repeater apparatuses 107 to 110 each amplify signals of the input signal group. The antennas 136 to 140 connected to the output terminals of the repeater apparatuses 106 to 110 are disposed so that the signal groups radiated in adjacent coverage areas are different from each other. As a result, interference between radio waves in the same frequency band is reduced in adjacent coverage areas and thus a stable communication environment is provided for the terminal 500.

Note that the relay systems described in the second and third exemplary embodiments can also be described as follows. That is, a relay system includes first and second relay apparatuses and antennas. The first relay apparatus corresponds to the repeater apparatuses 101 and 106 and outputs input signals that include two or more signals different from each other in frequency and that are sent from a wireless base station as two or more signal groups in which included signals are different from each other in frequency.

The second relay apparatuses correspond to the repeater apparatuses 102 to 105 and 107 to 110, are cascade-connected to the first relay apparatus separately for each of the signal groups input to the second relay apparatuses, and relay the signal groups.

The antennas correspond to the antennas 131 to 140 and are each connected to one of an output terminal of the first relay apparatus and output terminals of the second relay apparatuses. The antennas are disposed so that the signal group that spans a first coverage area formed corresponding to one of the output terminals of the first and second relay apparatuses and the signal group that spans a second coverage area adjacent to the first coverage area are different from each other. For example, in FIG. 5, the coverage areas 501, 503 and 505 are first coverage areas and the coverage areas 502 and 504 are second coverage areas. The foregoing relay system can also form coverage areas subject to less interference.

Fourth Exemplary Embodiment

Figure 7:
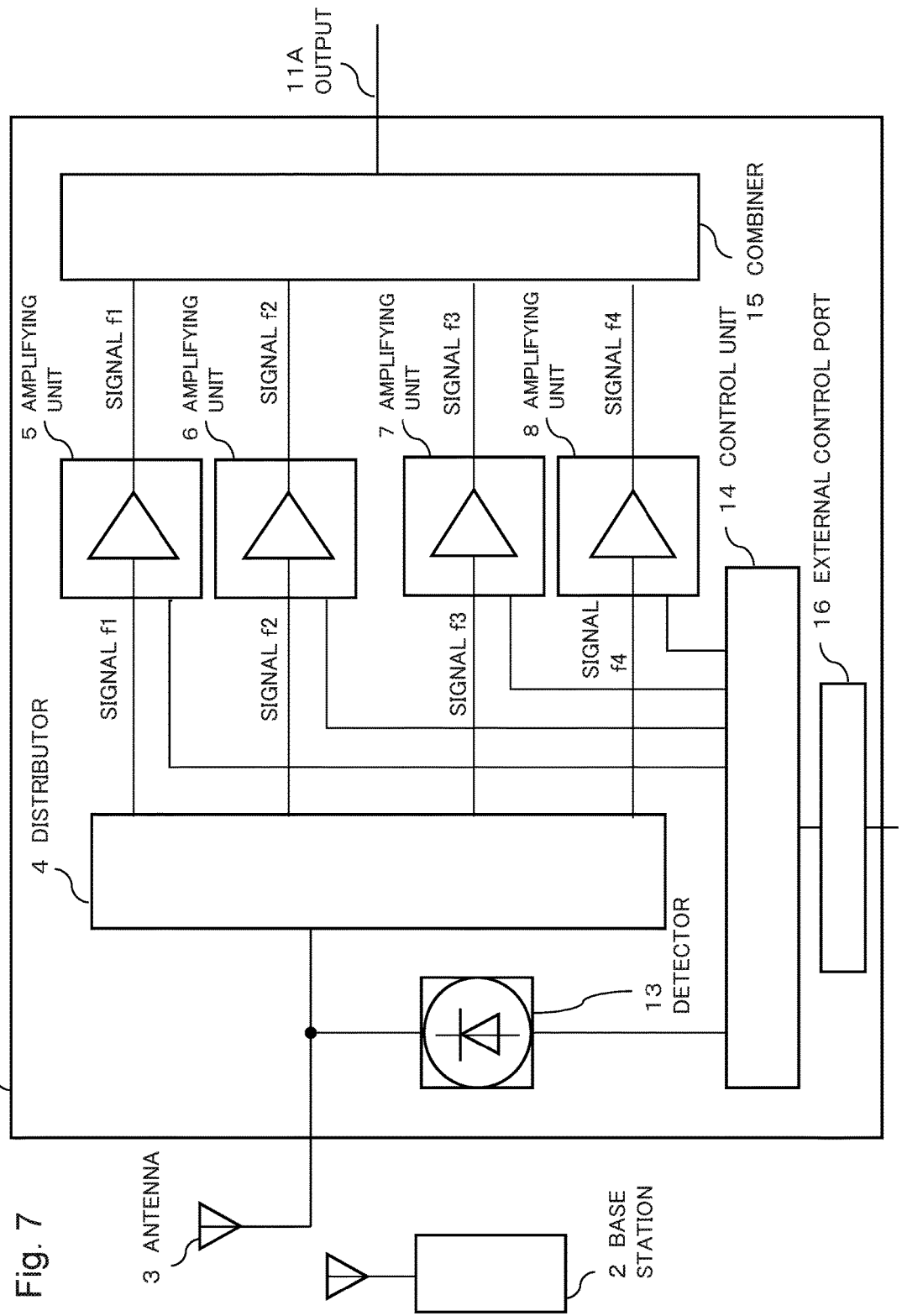
FIG. 7 is a block diagram illustrating a configuration example of a repeater apparatus according to a fourth exemplary embodiment.

FIG. 7 is a block diagram illustrating a configuration example of a repeater apparatus 1A of a fourth exemplary embodiment of the present invention. The repeater apparatus 1A is different from the repeater apparatus 1 of the first exemplary embodiment illustrated in FIG. 1 in including a combiner 15 instead of the combiners 9 and 10 and further including an external control port 16 connected to a control unit 14. The repeater apparatus 1A includes a single output terminal 11A extending from the combiner 15. The combiner 15 combines signals f1 to f4 input from the amplifying units 5 to 8 and outputs a combined signal from the output terminal 11A. The number of signals that are combined is not limited to two. Note that the same component elements as in the repeater apparatus 1 in FIG. 1 will not be described again.

Signals output from the output terminal 11A are selected by an external apparatus (e.g., a personal computer of a maintenance person) connected to the external control port 16, in the following procedure. That is, the external apparatus instructs the control unit 14 via the external control port 16 to generate a control signal that turns on amplifying units that correspond to, of the signals f1 to f4, signals of frequencies that are to be output. Based on the instruction, the control unit 14 turns on or off each of the amplifying units 5 to 8.

For example, by giving the control unit 14 an instruction to turn on the amplifying units 5 and 6 and turn off the amplifying units 7 and 8, a repeater apparatus that outputs only the signal fa (the signal f1 and the signal f2) is realized. Furthermore, by giving the control unit 14 an instruction to turn off the amplifying units 5 and 6 and turn on the amplifying units 7 and 8, a repeater apparatus that outputs only the signal fb (the signal f3 and the signal f4) is realized. It should be apparent that a repeater apparatus that receives the signals f1 to f6 used in the third exemplary embodiment can also be caused to realize substantially the same functions as the repeater apparatus 1A, by turning on only amplifiers that amplify signals of frequencies that are to be output. In other words, the number of signals input to the combiner 15 is not limited to four.

The repeater apparatus 1 of the first exemplary embodiment is a repeater apparatus that has output terminals (the output terminal 11 and the output terminal 12) separately for each of the signal groups (the signal fa and the signal fb). The repeater apparatus 1A of the present exemplary embodiment has only one output terminal (the output terminal 11A) and is capable of selecting a signal to be amplified (i.e., a frequency to be amplified) by using the control unit 14. The repeater apparatus 1A configured in this manner can replace the repeater apparatuses 102 to 105 illustrated in FIG. 5 and the repeater apparatuses 107 to 110 illustrated in FIG. 6.

(Advantageous Effects of Fourth Exemplary Embodiment)

The fourth exemplary embodiment achieves an advantageous effect that application of the repeater apparatus 1A of the fourth exemplary embodiment having such a configuration as repeater apparatuses of the relay system 20 or 30 of the second or third exemplary embodiment also makes it possible to form coverage areas subject to less interference.

Fifth Exemplary Embodiment

In the first to fourth exemplary embodiments, transmission of signals in the downlink direction from the base station 2 to the terminal 500 via repeater apparatuses is described. A repeater apparatus that relays signals in the uplink direction from the terminal 500 to the base station 2 can be basically realized by configuring the repeater apparatus 1 illustrated in FIG. 1 to be capable of transmitting signals in the opposite direction.

Figure 8:
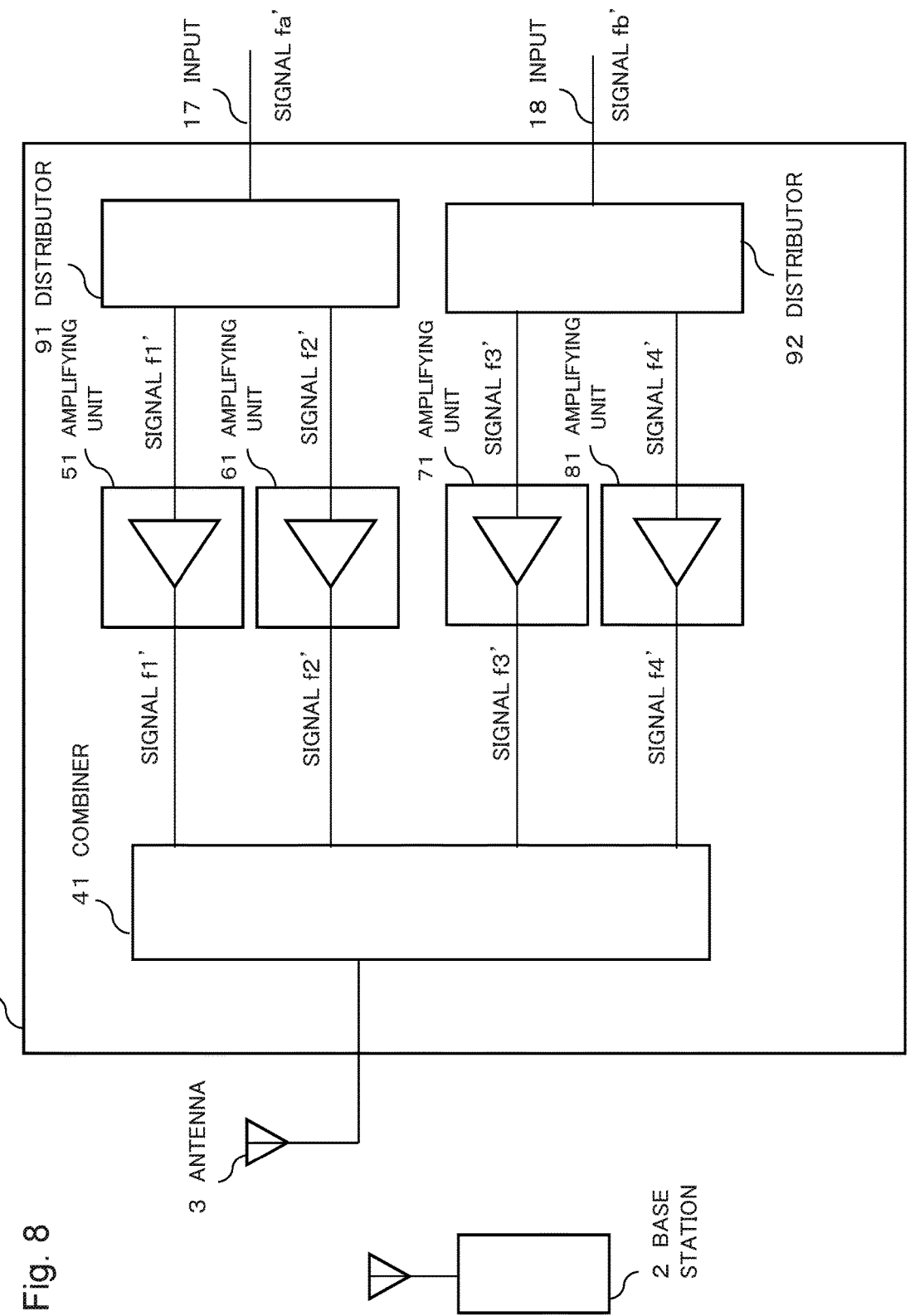
FIG. 8 is a block diagram illustrating a configuration example of a repeater apparatus according to a fifth exemplary embodiment.

FIG. 8 is a block diagram illustrating a configuration example of a repeater apparatus 1B of a fifth exemplary embodiment. The repeater apparatus 1B includes a combiner 41, amplifying units 51, 61, 71 and 81, and distributors 91 and 92. The distributor 91 separates a signal fa' that is a signal group input from an input 17 into a signal f1' and a signal f2' and then outputs the signal f1' and the signal f2'. The amplifying unit 51 amplifies the signal f1' and outputs the amplified signal f1' to the combiner 41. The amplifying unit 61 amplifies the signal f2' and outputs the amplified signal f2' to the combiner 41. The distributor 92 separates a signal fb' that is a signal group input from an input 18 into a signal f3' and a signal f4' and then outputs the signal f3' and the signal f4'. The amplifying unit 71 amplifies the signal f3' and outputs the amplified signal f3' to the combiner 41. The amplifying unit 81 amplifies the signal f4' and outputs the amplified signal f4' to the combiner 41. The combiner 41 combines the signals f1' to f4' and outputs them in a combined form to an antenna 3. The antenna 3 sends the signals f1' to f4' to the base station 2. Note that it is apparent that the number of signals be not limited to four, that is, the signals f1' to f4', but the repeater apparatus in the uplink direction can be similarly configured to handle, for example, six signals as in the third exemplary embodiment.

Use of the repeater apparatus 1B configured as described above makes it possible to relay signals in the uplink direction in, for example, the relay system 20 illustrated in FIG. 5. Furthermore, in order to use the antenna 3 for both the uplink and downlink directions, it is permissible that, for example, a device that separates and combines a sending path and a receiving path be inserted between the antenna 3 and the combiner 41 of the repeater apparatus 1B and be connected to the antenna 3-side of the distributor 4 of the repeater apparatus 1 illustrated in FIG. 1. Such a device may be a duplexer or a circulator. Using the antenna 3 for both the uplink and downlink directions in this manner, it becomes possible to provide only one antenna on the base station 2 side even when bidirectional communication is carried out. Similarly, a duplexer or the like may be inserted on the output side of each of the distributors 91 and 92 of the repeater apparatus 1B so that the antenna on the terminal 500 side can be used for both sending and receiving. Note that in the case where an frequency division duplex (FDD) method in which communication is carried out by using different frequencies for uplink signals and downlink signals is employed, the frequencies of the signals f1 to f4 and the signals f1' to f4' are selected so as to avoid overlap.

Combining the repeater apparatus 1 of the first exemplary embodiment and the repeater apparatus 1B of the present exemplary embodiment allows bidirectional communication between the base station 2 and the terminal 500 without decreasing the advantageous effects of the repeater apparatus 1. Similarly, further use of the repeater apparatus 1B of this exemplary embodiment in the relay system 20 of the second exemplary embodiment or the relay system 30 of the third exemplary embodiment allows bidirectional communication between the base station 2 and the terminal 500 while maintaining the advantageous effects of the relay system 20 or 30.

The repeater apparatus 1B may further have a control function for the amplifying units similar to that of the repeater apparatus 1 of the first exemplary embodiment. Specifically, the repeater apparatus 1B may further include a control unit capable of controlling the amplifying functions of the amplifying units 51, 61, 71 and 81 separately from each other and a detector capable of measuring levels of the signals f1 to f4, and the control unit may stop operation of one or more of the amplifiers for which the signal level detected by the detector is low.

Note that the functions and advantageous effects of the repeater apparatus 1B of the fifth exemplary embodiment can be described as follows with reference to a relay apparatus that includes only the distributors 91 and 92 and the combiner 41. The distributors 91 and 92 receive one or more signal groups (e.g., the signal fa and the signal fb) consisting of two or more signals whose frequencies are different from each other, separate signals included in the signal groups separately for each of the frequencies, and output the separated signals. The combiner 41 combines the signals (e.g. the signals f1 to f4) input from the distributors 91 and 92 and outputs the signals in a combined form. The relay apparatus configured in this manner is also able to combine signal groups received from a plurality of coverage areas spanned by a plurality of signal groups and output the signal groups in a combined form to a base station, so that coverage areas subject to less interference can be formed.

Advantage Effects of Fifth Exemplary Embodiment

A combination of the repeater apparatus 1B of the fifth exemplary embodiment configured as described above with the repeater apparatus 1 of the first exemplary embodiment is applicable as a bidirectional relay apparatus to the repeater apparatuses of the relay systems 20 and 30 of the second and third exemplary embodiments. A relay system employing a bidirectional relay apparatus as described above is also able to form a coverage area subject to less interference.

Note that exemplary embodiments of the present invention can also be described as in, but are not limited to, the following supplementary notes.

(Supplementary Note 1)

A relay apparatus that includes a distributor configured to separate an input signal that includes a plurality of signals of mutually different frequencies for each of the frequencies and output signals separated for each frequency, and a combiner configured to combine signals output from the distributor, generate at least two signal groups each consisting of signals of mutually different frequencies, and output at least one signal group of the at least two signal groups.

(Supplementary Note 2)

The relay apparatus according to Supplementary Note 1 that further includes an amplifier configured to amplify levels of the signals from the distributor separately for each of the separated signals, and a controller configured to generate a control signal that controls start and stop of an operation of the amplifier separately for each of the separated signals and notify the control signal to the amplifier, wherein the combiner is configured to generate the at least one signal group by combining the signals output from the amplifier and output the at least one signal group separately for each of the at least one signal group.

(Supplementary Note 3)

The relay apparatus according to Supplementary Note 2 that further includes a detector that outputs a detection signal that indicates a level of the input signal for each frequency, wherein the controller is configured to control, based on the detection signal, the start and stop of the operation of the amplifier.

(Supplementary Note 4)

The relay apparatus according to Supplementary Note 3 wherein the controller is configured to instruct the amplifier to stop amplification of a signal whose level for each frequency is equal to or less than a preset threshold value, and carry out the amplification of a signal whose level for each frequency exceeds a preset threshold value.

(Supplementary Note 5)

The relay apparatus according to Supplementary Note 2 that further includes an interface between an external apparatus and the controller, wherein the controller is configured to control the start and stop of the operation of the amplifier, based on an instruction received from the external apparatus via the interface.

(Supplementary Note 6)

The relay apparatus according to Supplementary Note 2 wherein the controller is configured to control the amplifier so that only one signal group selected from the at least two signal groups is output from the combiner.

(Supplementary Note 7)

The relay apparatus according to Supplementary Note 1 wherein the combiner includes an output terminal that respectively corresponds to the at least one signal group.

(Supplementary Note 8)

The relay apparatus according to Supplementary Note 1 wherein the combiner includes only one output terminal that outputs the one signal group selected.

(Supplementary Note 9)

A relay system that includes a first relay apparatus configured to output at least one signal group of at least two signal groups each consisting of signals of mutually different frequencies sent by a radio base station, a second relay apparatus cascade-connected to the first relay apparatus separately for each of the signal groups and configured to relay the signal groups, and an antenna connected to either an output terminal of the first relay apparatus or an output terminal of the second relay apparatus and disposed separately for each of the output terminals so that one of the signal groups that forms a first coverage area formed corresponding to one of the output terminals and another one of the signal groups that forms a second coverage area adjacent to the first coverage area are different from each other.

(Supplementary Note 10)

The relay system according to Supplementary Note 9 wherein the output terminal of the second relay apparatus is further connected to another one of the second relay apparatus.

(Supplementary Note 11)

The relay system according to Supplementary Note 9 wherein each of the first relay apparatus and the second relay apparatus is the relay apparatus according to any one of Supplementary Notes 1 to 7.

(Supplementary Note 12)

The relay system according to Supplementary Note 9 or 10 wherein the first relay apparatus is the relay apparatus according to any one of Supplementary Notes 1 to 7 and the second relay apparatus is the relay apparatus according to Supplementary Note 8.

(Supplementary Note 13)

A relay method that includes separating an input signal that includes a plurality of signals of mutually different frequencies for each of the frequencies and outputting signals separately for each frequency, combining the separated and output signals, generating at least two signal groups each consisting of signals of mutually different frequencies, and outputting at least one signal group of the at least two signal groups.

(Supplementary Note 14)

The relay method according to Supplementary Note 13 that further includes amplifying levels of the separated and output signals separately for each of the separated signals, generating a control signal that controls start and stop of the amplification separately for each of the separated signals, controlling the amplification based on the control signal, generating the at least one signal group by combining the amplified signals using the combiner, and outputting the at least one signal group separately for each signal group.

(Supplementary Note 15)

The relay method according to Supplementary Note 14 that further includes outputting a detection signal that indicates the levels of the input signals separately for each frequency, and controlling the start and stop of operation of the amplification based on the detection signal.

(Supplementary Note 16)

A program of a relay apparatus for causing a computer of the relay apparatus to execute a procedure of separating an input signal that includes a plurality of signals of mutually different frequencies separately for each of the frequencies and outputting signals separated for each frequency, a procedure of combining the separated and output signals, a procedure of generating at least two signal groups each consisting of signals of mutually different frequencies, and a procedure of outputting a selected signal group of the at least two signal groups.

(Supplementary Note 17)

A relay apparatus that includes a distributor that receives at least one signal group consisting of a plurality of signals of mutually different frequencies and that separates signals included in the at least one signal group separately for each frequency and output the signals separated for each frequency, and a combiner that combines signals from the distributor and outputs the signals combined.

(Supplementary Note 18)

The relay apparatus according to Supplementary Note 17 that further includes an amplifier that amplifies signals from the distributor separately for each of the separated signals.

(Supplementary Note 19)

A bidirectional relay apparatus that includes the relay apparatus according to any one of Supplementary Notes 1 to 8 and the relay apparatus according to any one of Supplementary Note 17 or 18.

(Supplementary Note 20)

A relay method that includes inputting at least one signal group consisting of a plurality of signals of mutually different frequencies, separating signals included in the signal group for each frequency and outputting the signals separated, and combining the separated signals and outputting signals combined.

While the present invention has been described above with reference to the exemplary embodiments, the present invention is not limited to the foregoing exemplary embodiments. Configurations and details of the present invention can be changed in various manners so as to be understood within the scope of the invention by a person with ordinary skill in the art.

Furthermore, configurations of the exemplary embodiment described above are not necessarily exclusive of each other. The operation and advantageous effects of the present invention may be realized by a configuration combining the foregoing exemplary embodiments entirely or partially.

The invention claimed is:

1. A relay apparatus comprising:
a distributor configured to separate an input signal that includes a plurality of signals of mutually different frequencies for each of the frequencies and output signals separated for each frequency; and
a combiner configured to combine signals output from the distributor, generate at least two signal groups each consisting of signals of mutually different frequencies, and output the at least two signal groups.

2. The relay apparatus according to claim 1, further comprising:
an amplifier configured to amplify the signals from the distributor separately for each of the separated signals; and
a controller configured to generate a control signal that controls start and stop of an operation of the amplifier separately for each of the separated signals and notify the control signal to the amplifier, wherein the combiner is configured to generate the at least one signal group by combining signals output from the amplifier and to output the at least one signal group separately for each of the at least one signal group.

3. The relay apparatus according to claim 2, further comprising
a detector configured to output a detection signal that indicates a level of the input signal for each frequency,
wherein the controller is configured to control, based on the detection signal, the start and stop of the operation of the amplifier.

4. The relay apparatus according to claim 3, wherein the controller is configured to instruct the amplifier to
stop amplification of a signal whose level for each frequency is equal to or less than a preset threshold value, and
carry out the amplification of a signal whose level for each frequency exceeds a preset threshold value.

5. The relay apparatus according to claim 2, further comprising
an interface between an external apparatus and the controller,
wherein the controller is configured to control the start and stop of the operation of the amplifier, based on an instruction received from the external apparatus via the interface.

6. The relay apparatus according to claim 2, wherein the controller is configured to control the amplifier so that only one signal group selected from the at least two signal groups is output from the combiner.

7. The relay apparatus according to claim 1, wherein the combiner includes at least two output terminals that each corresponds to at least two signal groups.

8. A relay system comprising:
a first relay apparatus configured to output at least two signal groups each consisting of signals of mutually different frequencies sent by a radio base station;
a second relay apparatus cascade-connected to the first relay apparatus separately for each of the signal groups and configured to relay the signal groups; and
an antenna connected to one of an output terminal of the first relay apparatus and an output terminal of the second relay apparatus and disposed separately for each of the output terminals so that one of the signal groups that forms a first coverage area formed corresponding to one of the output terminals and another one of the signal groups that forms a second coverage area adjacent to the first coverage area are different from each other.

9. The relay system according to claim 8, wherein
the first relay apparatus includes a distributor configured to separate an input signal that includes a plurality of signals of mutually different frequencies for each of the frequencies and output signals separated for each frequency; and
a combiner configured to combine signals output from the distributor, generate at least two signal groups each consisting of signals of mutually different frequencies, and output at least two signal groups.

10. A non-transitory medium recording a program that causes a computer to execute:
a step of separating an input signal that includes a plurality of signals of mutually different frequencies for each of the frequencies and outputting signals separated for each frequency,
a step of combining the output signals,
a step of generating at least two signal groups each consisting of signals of mutually different frequencies, and
a step of outputting the at least two signal groups.

\* \* \* \* \*